US008091016B2

(12) United States Patent
Winkler et al.

(10) Patent No.: US 8,091,016 B2
(45) Date of Patent: Jan. 3, 2012

(54) VISUALLY MANIPULATING INSTANCE COLLECTIONS

(75) Inventors: Matthew R. Winkler, Kenmore, WA (US); Ramrajprabu Balasubramanian, Renton, WA (US); Balasubramanian Shyamsundar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 434 days.

(21) Appl. No.: 12/338,859

(22) Filed: Dec. 18, 2008

(65) Prior Publication Data

US 2010/0161674 A1   Jun. 24, 2010

(51) Int. Cl.
G06F 17/00 (2006.01)
G06F 17/20 (2006.01)
(52) U.S. Cl. ......... 715/204; 715/763; 715/798; 707/796
(58) Field of Classification Search ........................ None
See application file for complete search history.

(56) References Cited

U.S. PATENT DOCUMENTS

| | | | |
|---|---|---|---|
| 5,615,351 A | 3/1997 | Loeb | |
| 5,682,482 A | 10/1997 | Burt et al. | |
| 5,999,911 A | 12/1999 | Berg et al. | |
| 6,549,221 B1 * | 4/2003 | Brown et al. | 715/854 |
| 6,636,241 B1 * | 10/2003 | Arning | 715/762 |
| 6,732,153 B1 | 5/2004 | Jakobson et al. | |
| 6,911,978 B2 * | 6/2005 | Nomiyama et al. | 345/440 |
| 6,924,827 B1 * | 8/2005 | Gulati et al. | 715/763 |
| 7,003,781 B1 | 2/2006 | Blackwell et al. | |
| 7,249,195 B2 | 7/2007 | Panec et al. | |
| 7,263,662 B1 * | 8/2007 | Ballard et al. | 715/762 |
| 7,409,408 B2 | 8/2008 | Conn et al. | |
| RE42,101 E * | 2/2011 | Chasen et al. | 707/805 |
| 2003/0095143 A1 * | 5/2003 | Lauris | 345/762 |
| 2003/0195959 A1 | 10/2003 | Labadie et al. | |
| 2004/0113953 A1 * | 6/2004 | Newman | 345/853 |
| 2004/0148586 A1 * | 7/2004 | Gilboa | 717/108 |
| 2004/0205638 A1 * | 10/2004 | Thomas et al. | 715/526 |
| 2004/0225960 A1 * | 11/2004 | Parikh et al. | 715/517 |
| 2004/0243938 A1 * | 12/2004 | Weise et al. | 715/526 |
| 2005/0097536 A1 | 5/2005 | Bernstein et al. | |
| 2005/0188349 A1 * | 8/2005 | Bent et al. | 717/106 |
| 2006/0074733 A1 | 4/2006 | Shukla et al. | |
| 2006/0075352 A1 * | 4/2006 | Burke et al. | 715/763 |
| 2006/0242604 A1 * | 10/2006 | Wong et al. | 715/854 |
| 2006/0248480 A1 * | 11/2006 | Faraday et al. | 715/866 |
| 2007/0180386 A1 * | 8/2007 | Ballard et al. | 715/744 |
| 2007/0240070 A1 * | 10/2007 | Eldridge et al. | 715/763 |

(Continued)

OTHER PUBLICATIONS

U.S. Appl. No. 12/338,852, filed Dec. 18, 2008, Winkler.
Kolawa, Adam, "BPEL in a Service-Oriented Architecture", Jun. 2006, 8 pages.

(Continued)

Primary Examiner — Pierre Vital
Assistant Examiner — Augustine Obisesan
(74) Attorney, Agent, or Firm — Workman Nydegger

(57) ABSTRACT

The present invention extends to methods, systems, and computer program products for visually manipulating instance collections. Items presenters present data collections along with custom designers for each data element in the data collections. The customer designers also permit data elements in the collection to be edited in situ. Items presenters maintain data elements in a position aware fashion. Thus, data elements can be inserted into (potentially at a specified location) and deleted from an items presenter to corresponding add and delete the data elements from a data collection. Data elements can be visually moved from an items presenter in one root user interface to an items presenter in another root user interface to corresponding move the data elements between corresponding data collections.

13 Claims, 7 Drawing Sheets

U.S. PATENT DOCUMENTS

| | | | |
|---|---|---|---|
| 2007/0245357 | A1 | 10/2007 | Breiter et al. |
| 2008/0040191 | A1 | 2/2008 | Chakravarty et al. |
| 2008/0092067 | A1* | 4/2008 | Anderson et al. ............. 715/762 |
| 2008/0196018 | A1 | 8/2008 | Russ |

OTHER PUBLICATIONS

Barga, Roger S., "Coping with Variable Latency and Disorder in Distributed Event Streams", Proceedings of the 26th IEEE International Conference on Distributed Computing Systems Workshops (ICDCSW'06), 2006, 6 pages.

IBM Corporation, "Correlation methods", 2000, 2004, 1 page.

Hanemann, Andreas, et al., "Service-Oriented Event Correlation—the MNM Service Model Applied to E-Mail Services", 2004, 14 pages.

Schmidt, Mark "WFPad—Viewing/Editing Workflow's in XML", 2005, 4 pages.

Hayden, David "Web Client Software Factory—Model-View-Presenter and Page Workflow", 2007, 7 pages.

Novell "Provisioning Workflow", Apr. 2004, 42 pages.

Wisniewski, Scott "Map LINQ: Create Dynamic Maps with Visual Basic 9.0 and WPF". 2008, 7 pages.

Chamberland, L.A., et al., "IBM VisualAge for Java", IBM Systems Journal vol. 37, No. 3, 1998, Java Technology, 17 pages.

Goldman, Kenneth J. "A Demonstration of JPie: An Environment for Live Software Construction in Java", OOPSLA'03, Oct. 26-30, 2003, ANaheim, CA, USA, 2 pages.

* cited by examiner

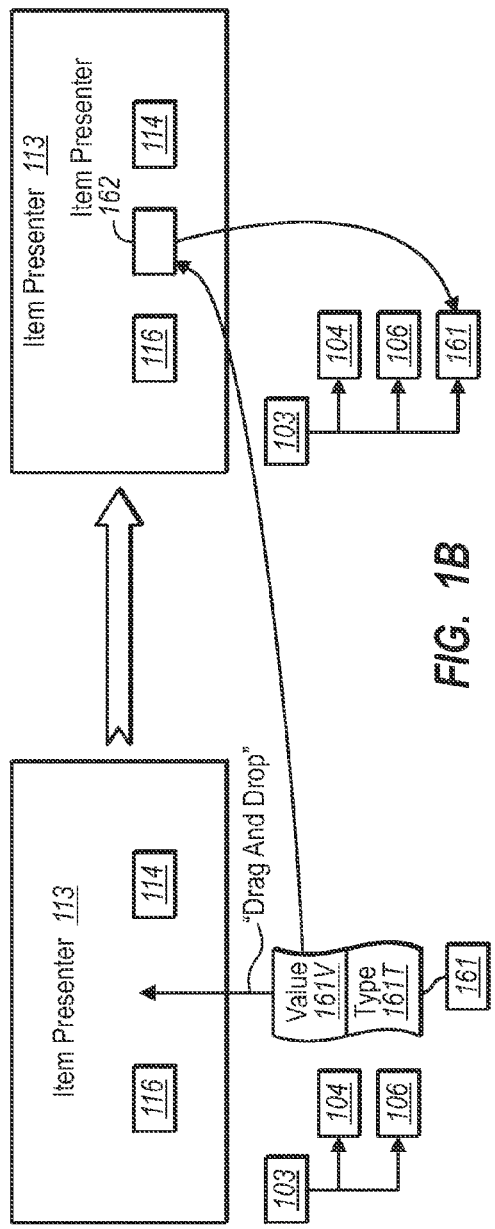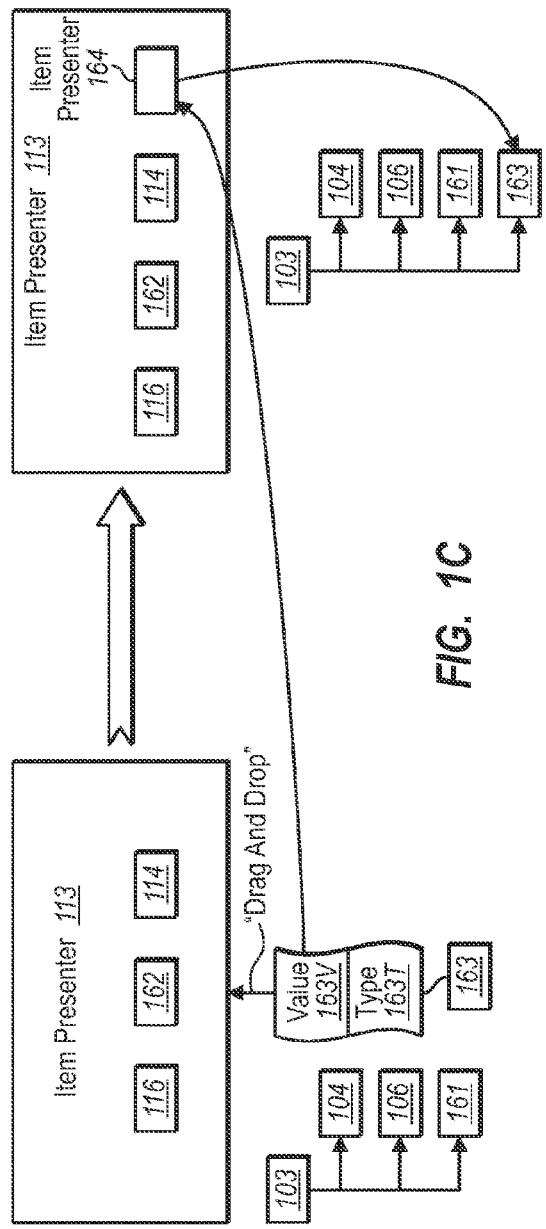

VISUALLY MANIPULATING INSTANCE COLLECTIONS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Many computing tasks include an application program manipulating data in response to user commands to express the user's intent within the data file. For example, a word processor can modify the contents of a word processing document in response to user commands received through a user-interface of the word processor. Other application programs can be used to manipulate spreadsheets, database entries, images, executable software code, etc.

Some applications use visual designers to present collections of arbitrary objects. However, these visual designers do not provide a mechanism to both display a collection of arbitrary object types, and the ability to edit that collection in situ, as well as the items contained within it, without resorting to a text based grid methaphor.

The problem is particularly acute when creating an editing experience for workflow (due to the composite nature of a workflow) or other hierarchal data. Since workflow is typically composite in nature, shifts between different types of data are likely to occur. For example, any given element in a workflow may compose an arbitrary number of additional elements, and it is highly possible that each of those composed elements will in turn compose additional elements. When creating designers for these elements, there are a number of places where a placeholder is required which will in turn render the appropriate design surface for the element placed there. However, at the design time of the designer, the design surface to be rendered is unknown, and may in fact be determined at runtime.

BRIEF SUMMARY

The present invention extends to methods, systems, and computer program products for visually manipulating instance collections. In some embodiments, a portion of a data collection is visually edited. A root user interface is presented to visualize data from a data collection including a plurality of data elements. An items presenter is presented within the root user interface. The items presenter is configured as a child element beneath the root user interface and isolated from the root user interface. The items presenter includes an item presenter for each data element in the data collection.

The items presenter is further configured to link to each data element in the plurality of data elements and visually present each data element in the plurality of data elements. The items presenter is also configured to manage the arrangement of the presented data elements, including the position of presented data elements relative to one another, within the root user interface. The items presenter is additionally configured to process changes to the presented data elements within the item presenter in isolation from the root user interface. Accordingly, changes to presented data elements can be implemented without interfering with the functionality of the root user interface.

User input representing a visual gesture with respect to the plurality of data elements is detected. The visual gesture indicates a desired user change to the arrangement of the presented data element. The items presenter processes the visual gesture within the items presenter to implement the desired user change to the arrangement of the presented data elements without interfering with the functionality of root user interface. The data elements are presented after processing the visual gesture to reflect the desired user change to the arrangement of the presented data elements.

In other embodiments, a collection of a plurality of data elements is moved between data collections. A data collection is visually selected from within an items presenter corresponding to the data collection. The items presenter is configured as a child element underneath the root user interface and is isolated from the root user interface. The items presenter links to each data element in the data collection. The items presenter also presents each data element in the first collection within the root user interface. Further, the items presenter manages the arrangement of the presented data elements, including the position of presented data elements relative to one another, within the root user interface.

The data elements of the data collection are visually moved to a second root user interface corresponding to a second different data collection. The data elements are dropped into the second root user interface. In response to dropping the data elements, a second items presenter in the second root user interface is used to link each data element to the second data collection. Each data element is also presented within the second root user interface. The presented data elements are arranged, including the position of presented data elements relative to one another, in accordance with the second items presenter within the second root user interface.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 1B-1D illustrate components of the computer architecture of FIG. 1A that facilitate visually editing a data collection.

DETAILED DESCRIPTION

Figure 1A:
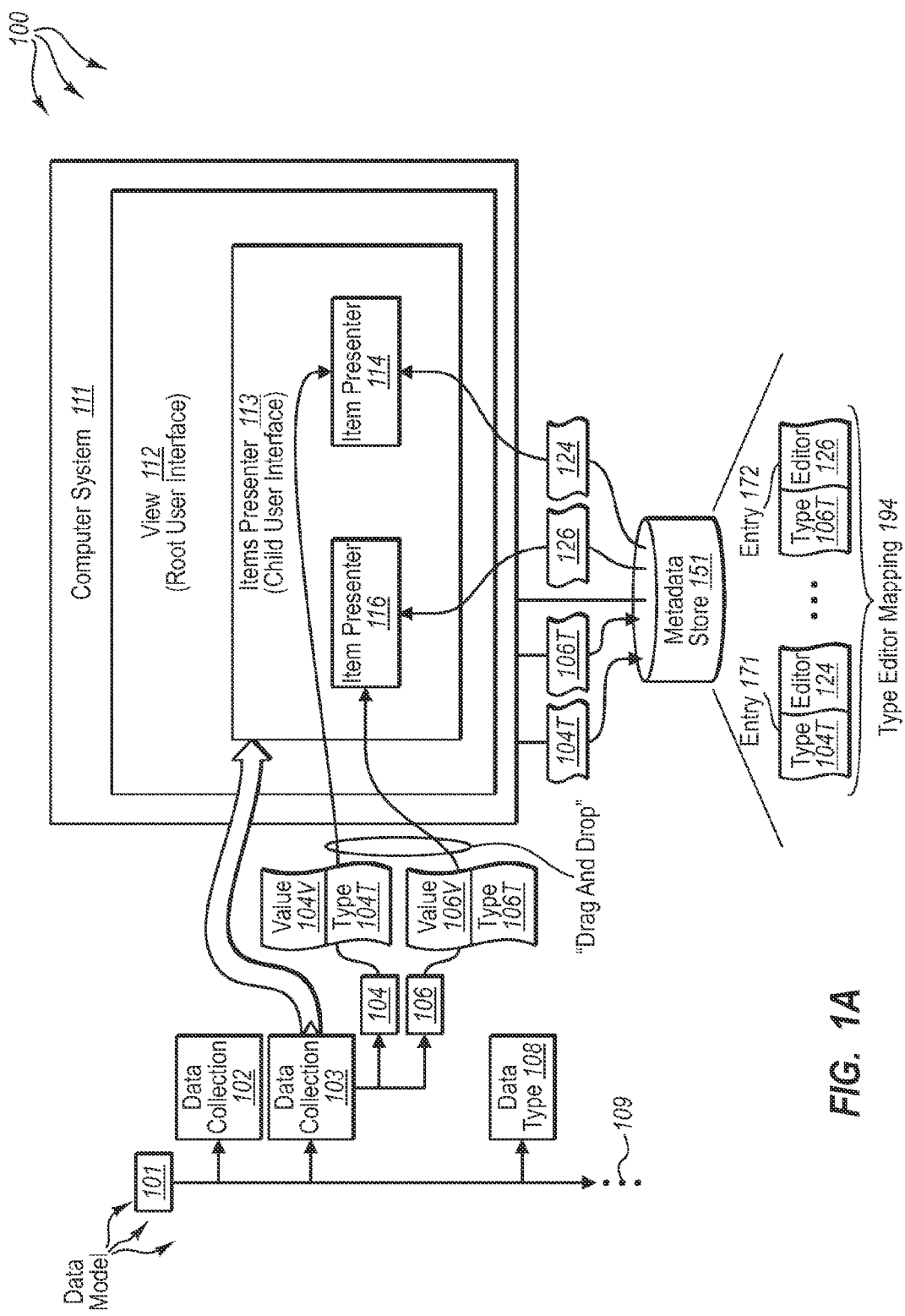
FIG. 1A illustrates an example computer architecture that facilitates visually manipulating instance collections.

The present invention extends to methods, systems, and computer program products for visually manipulating instance collections. In some embodiments, a portion of a data collection is visually edited. A root user interface is presented to visualize data from a data collection including a plurality of data elements. An items presenter is presented within the root user interface. The items presenter is configured as a child element beneath the root user interface and isolated from the root user interface. The items presenter includes an item presenter for each data element in the data collection.

The items presenter is further configured to link to each data element in the plurality of data elements and visually present each data element in the plurality of data elements. The items presenter also configured to manage the arrangement of the presented data elements, including the position of presented data elements relative to one another, within the root user interface. The items presenter is additionally configured to process changes to the presented data elements within the item presenter in isolation from the root user interface. Accordingly, changes to presented data elements can be implemented with out interfering with the functionality of root user interface.

User input representing a visual gesture with respect to the plurality of data elements is detected. The visual gesture indicates a desired user change to the arrangement of the presented data element. The items presenter processes the visual gesture within the items presenter to implement the desired user change to the arrangement of the presented data elements without interfering with the functionality of root user interface. The data elements are presented after processing the visual gesture to reflect the desired user change to the arrangement of the presented data elements.

In other embodiments, a collection of a plurality of data elements is moved between data collections. A data collection is visually selected from within an items presenter corresponding to the data collection. The items presenter is configured as a child element beneath the root user interface and is isolated from the root user interface. The items presenter links to each data element in the data collection. The items presenter also presents each data element in the first collection within the root user interface. Further, the items presenter manages the arrangement of the presented data elements, including the position of presented data elements relative to one another, within the root user interface.

The data elements of the data collection are visually moved to a second root user interface corresponding to a second different data collection. The data elements are dropped into the second root user interface. In response to dropping the data elements, a second items presenter in the second root user interface is used to link each data element to the second data collection. Each data element is also presented within the second root user interface. The presented data elements are arranged, including the position of presented data elements relative to one another, in accordance with the second items presenter within the second root user interface.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1A illustrates an example computer architecture 100 that facilitates visually manipulating instance collections. Referring to FIG. 1, computer architecture 100 includes computer system 111, metadata store 151, and data model 101. Each of the depicted computer systems is connected to one another over (or is part of) a network, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Data model 101 can represent an instance of a portion of data from a file, a data base, Web service, or any other location. Data model 101 is represented hierarchically to depicted how different portions of data related to one another. Data instance 101 can include one or more data collections that each includes one or more data elements. Data elements can also include further data sub-elements. As depicted, data model 101 includes data collections 102, 103, and 108. Data collection 103 further includes data elements 104 and 106. For example, data collection 103 can represent a sequence in which data elements 104 and 106 are included. Vertical ellipsis 109 represents that data model 101 can include further data collections and corresponding data elements and data sub-elements.

Computer system 111 can be configured with general purpose graphics functionality for presenting user interface elements at a video display device, such as, for example, a computer monitor or television. Thus, generally, computer system 111 can access data, for example, from data collection 103, and present the data through a user interface at a video display device. In some embodiments, computer system 111 presents a root user interface that includes one or more user interface elements, including child user interfaces.

A user interface designer can design a root user interface to include one or more child user interfaces. An item presenter is one example of a child user interface that can be included within a root user interface. During design time, an items presenter provides a visual placeholder indicating where data elements can be visualized at run time. For example, a designer can design view 112 (a root user interface) to include items presenter 113 (a child user interface). Thus, during the design of view 112, the designer is aware of where data is to surface during run time (even if the types of data are not known at design time). Accordingly, a root user interface can be authored without express knowledge of the data types that are to be presented in the future.

An items presenter for a data collection can be configured to include individual item presenters for each data element in a data collection. The individual item presenters can be configured with executable instructions (e.g., a handler) that are wired to data insertion events. A computer hardware component can cause a data insertion event. For example, a data insertion event can be a mouse related event, such as, for example, a drop event associated with a drag and drop operation implemented with a hardware mouse. Alternately, an insertion event can be a keyboard entry event associated manual insertion of data into a field.

In response to detecting a data insertion event, the executable instructions can be configured to create new instances of dropped objects, create editing experiences for the new instances of the dropped objects based on the data type of the dropped objects, and visually display the editing experiences. Thus, during run time, when data is inserted at (e.g., dropped into) an items presenter, a processor executes the executable instructions for individual item presenters to determine the data types (e.g., character, string, integer, binary, user-defined, workflow, sequence, data structure, etc.) of the inserted data and presents appropriate editors for the inserted data.

An items presenter is aware of its corresponding data collection. As such, an items presenter can perform inserts, deletes, moves, etc, within the context of its corresponding data collection. For example, a user can insert a data element at a specified location between other data elements (e.g., "at location 4").

Metadata store 151 includes type/editor mapping 114. Type/editor mapping 114 includes entries, such as, for example, entries 171 and 172, that map data types to corresponding visualizations/editors. For example, entry 171 maps type 104T (e.g., string) to editor 124 (e.g., a character editor). Similarly, entry 174 maps type 106T (e.g., a workflow) to editor 126 (e.g., a workflow editor). In order to resolve the editor to be presented at runtime, an item presenter can refer to metadata store 151. Accordingly, executable instructions of an item presenter can query metadata store 151 with a data type to determine the corresponding editor for the data type. Through reference to metadata store 151, configurations can be altered at runtime, such as, for example, to accommodate a specified data type.

In some embodiments, an item presenter is added to a root user interface and subsequently configured using the combination of a markup language and a graphical presentation foundation. For example, an item presenter can be added and configured in accordance with Windows Presentation Foundation ("WPF") and Extensible Application Markup Language ("XAML") as depicted in the following code sample:

```
<Border Name="border1" BorderThickness="3">
    <WorkflowItemsPresenter  Items="{Binding
Path=ModelItem.Customers, Mode=TwoWay}" />
    </Border>
```

The code sample can be used to configure an item presented with the indicated border thickness and margins. The customers collection is bound to the items presenter. Thus, each data element in the customers collection (e.g., a set of customer instances) can be rendered in situ. At runtime for a root user interface, the WPF data binding can be used to resolve the data collection to be rendered inside the items presenter. When the binding is not yet set, for example, because the underlying values have not been set, the item presenter presents a configurable string of text indicating what the user is supposed to drop onto the surface. The user can then drag and drop from a toolbox, or from elsewhere in the root user interface and drop a data collection onto the item presenter. Dropping a data collection causes (e.g., in response to a handler detecting a drop event) the items presenter to add a new instance (e.g., in the toolbox case) to the dropped data collection.

Thus, computer system 111 can present view 112 to visualize data from data collection 103. Computer system 111 can present items presenter 113 as a child user interface beneath view 112 and within view 112. Items presenter 113 can be placed anywhere underneath view 112. For example, items presenter 113 can be a direct child user interface element of view 112. Alternately, items presenter 113 can be the child user interface element of some other child user interface element within view 112.

Items presenter 113 is configured to provide visualizations (e.g., individual item presenters 114 and 116) for data elements 104 and 106. Items presenter 113 is also configured to determine the data types of data elements received at items presenter 113.

Data elements 104 and 106 can subsequently be dragged from outside of view 112 and dropped onto items presenter 113. Each of data elements in data collection 103 can include a value and a data type. For example, data elements 104 and 106 include values 104V and 106V and types 104T and 106T respectively. Thus, values 104V and 106V and types 104T and 106T can be received at items presenter 113

Item presenters 114 and 116 (e.g., through a configured handler) can determine that value 104V is of data type 104T ad value 106V is of data type 106T respectively. Item presenters 114 and 116 can query metadata store 151 for editors corresponding to data types 104T and 106T respectively. Metadata store 151 can refer to entry 171 to determine that type 104T corresponds to editor 124 and to entry 172 to determine that type 106T corresponds to editor 126. Editors 124 and 126 (or references thereto) can be returned to item presenters 114 and 116 respectively. Item presenter 114 can instantiate an instance of editor 124 and item presenter 116 can instantiate an instance of editor 126. Item presenter 114 can bind value 104V to editor 124 and item presenter 116 can bind value 106V to editor 126. Thus, through individual item presenters 114 and 116, items presenter 113 essentially provides a link to each data element in data collection 103.

An items presenter can also be configured to manage the arrangement of presented data elements, including the position of presented data elements relative to one another, with the root user interface. For example, items presenter 113 can manage the position of item presenter 116 relative to item presenter 114 within view 112. Items presenter 113 can also maintain the relative positions of item presenters 116 and 114 when new item presenters are added to items presenter 113, when the position of other item presenters in items presenter 113 are changed, or when item presenters are deleted from items presenter 113.

Embodiments of the invention include items presenters and item presenters that are isolated from their corresponding root user interface. An items presenter (as well as an item presenter) can be isolated by process and/or memory. Thus, changes to items presenters and item presenters, such as, for example, instantiations of specified visualizations, can be implemented without interfering with the functionality of the root user interface. For example, items presenter 113 can instantiate item presenters 114 and 116 without interfering with view 112. Similarly, item presenters 114 and 116 can instantiate editors 124 and 126 respectively without interfering with view 112. Accordingly, composable user interfaces can be designed more efficiently.

Additionally, an items presenter can process changes to the content and/or arrangement of item presenters within the items presenter in isolation from the root user interface. Accordingly, changes to presented data elements can be implemented without interfering with the functionality of the root user interface. For example, items presenter 113 can change the content within item presenters 114 and 116 and/or the arrangement of item presenters 114 and 116 in isolation from and without interfering with the functionality of view 112.

Figure 1D:
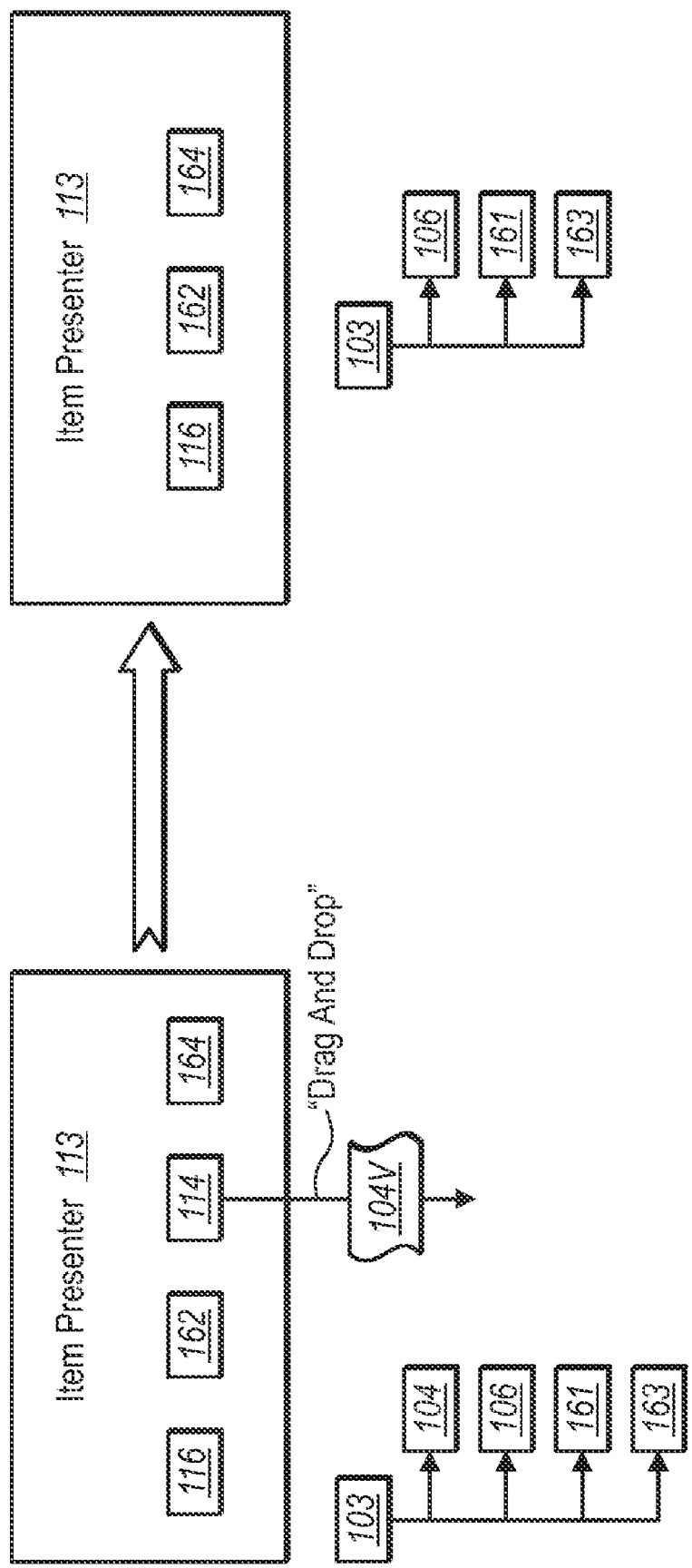
Figure 2:
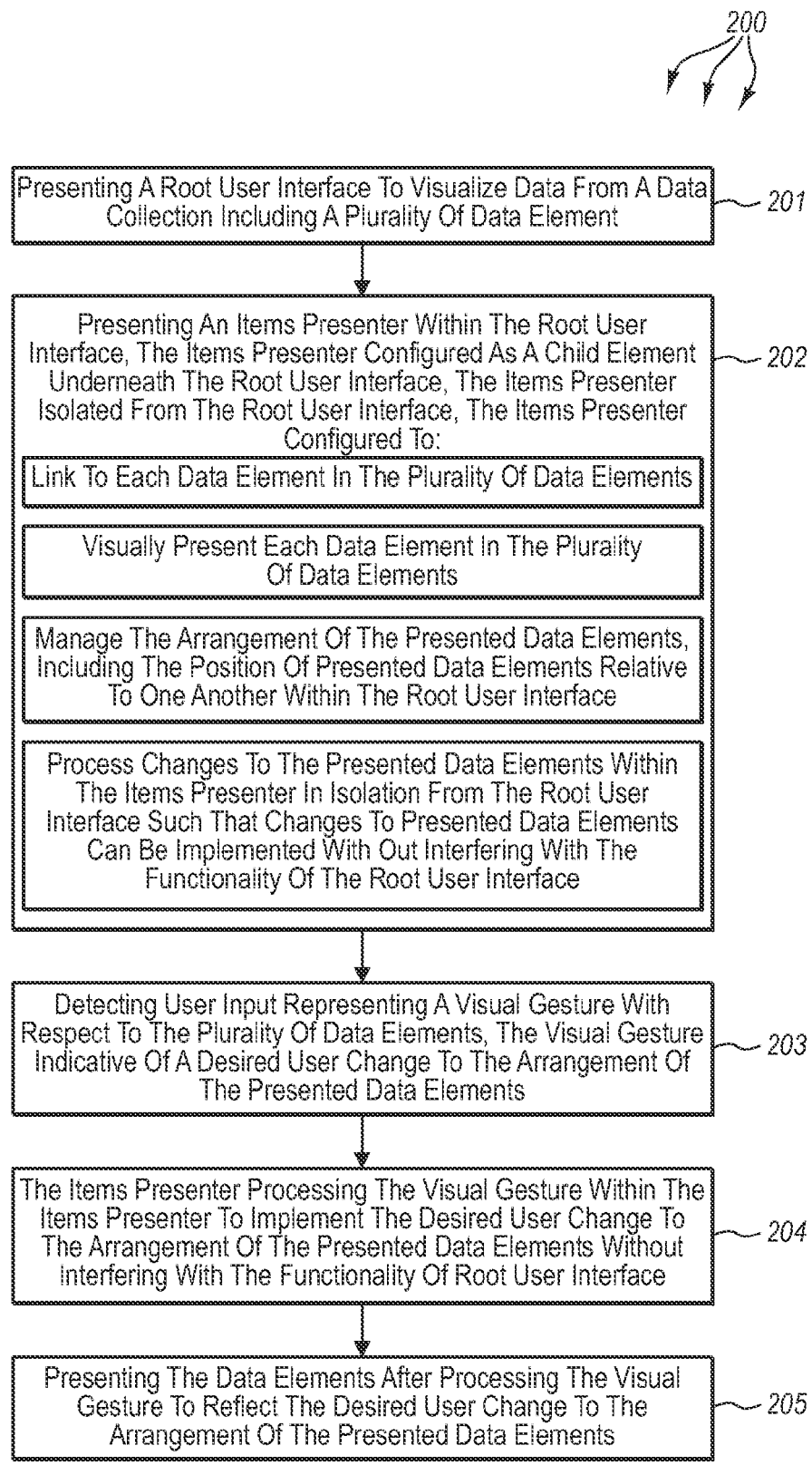
FIG. 2 illustrates a flow chart of an example method for visually manipulating instance collections.

FIGS. 1B-1D illustrate components of computer architecture 100 that facilitate visually editing a data collection. FIG. 2 illustrates a flow chart of an example method 200 for visually manipulating instance collections. Method 200 will be described with respect to the components and data in FIGS. 1A-1D.

Method 200 includes an act of presenting a root user interface to visualize data from a data collection including a plurality of data elements (act 201). For example, computer system 111 can present view 112.

Method 200 includes an act of presenting an items presenter within the root user interface, the items presenter configured as a child element of the root user interface, the item presenter isolated from the root user interface (act 202). For example, computer system 111 can present items presenter 113 within view 112 as a child user interface element below view 112. Items presenter 113 can be isolated (e.g., through memory and/or process isolation) from view 112.

An items presenter can be configured to link to each data element in a data collection. For example, items presenter 113 is configured to link to each data element in data collection 103 (i.e., linking to data elements 104 and 106). An items presenter can also be configured to visually present each element in the plurality of data elements. For example, items presenter 113 is configured to visually present data elements 104 and 106. An items presenter can also be configured to manage the arrangement of the presented data elements, including the position of presented data elements relative to one another within the root user interface. For example, items presenter 113 can manage the arrangement of presented data elements from data collection 103, including the position of data element 104 and 106 relative to another, within view 112.

An items presenter can also be configured to process changes to the presented data elements within the items presenter in isolation from the root user interface such that changes to presented data elements can be implemented without interfering with the functionality of the root user interface. For example, items presenter 113 can process changes (through the use of individual item presenters) to the presented data elements from data collection 103 in isolation from view 112. Accordingly, items presenter 113 can implement changes without interfering with view 112.

Changing presented data elements can include editing the value of a data element, such as, for example, changing the spelling of a word, a numeric value, etc. Changing presented data elements can also include modifying the arrangement of presented data elements relative to one another. Changing presented data elements can also include appending, adding, or inserting data elements in an items presenter. Data elements can be appended, added, or inserted in general or to specific locations relative to other data elements. Changing presented data elements can also include removing a data element form an items presenter.

Method 200 includes an act of detecting user input representing a visual gesture with respect to the plurality of data elements, the visual gesture indicative of a desired user change to the arrangement of the presented data elements (act 203). For example, referring to FIG. 1B, items presenter 113 can detect that data element 161 has been dragged and dropped between item presenters 116 and 114. Dropping data element 161 between item presenters 116 and 114 indicates a desired user change to add data element 161 to data collection 103 and to insert data element 161 between item presenters 116 and 114 within view 112.

Method 200 includes an act of the items presenter processing the visual gesture within the items presenter to implement the desired user change to the arrangement of the presented data elements without interfering with the functionality of the root user interface (act 204). For example, items presenter 113 can process the drag and drop gesture within items presenter 113 to insert item presenter 162 (typed for data type 161T through reference to metadata store 151) between item presenters 116 and 114 without interfering with the functionality of view 112. Method 200 includes an act of presenting the data elements after processing the visual gesture to reflect the desired user change to the arrangement of the presented data elements (act 205). For example, items presenter 113 can present data values 106V, 161V, and 104V at item presenters 116, 162, and 114 respectively to reflect the insertion of data element 161 into data collection 103.

Referring now to FIG. 1C, it may be that a drag and drop gesture is used to drop data element 163 onto items presenter 113. Data element 163 can be generally dropped onto items presenter 113 but not in any specific location relative to other data elements (or can be dropped in a location where a user's intent relative to other data elements is not readily discernable). Items presenter 113 can detect that data element 163 has been dragged and dropped onto items presenter 113. Dropping data element 163 onto items presenter 113 can indicate a desired user change to add data element 163 to data collection 103.

Items presenter 113 can process the drag and drop gesture within items presenter 113 to insert item presenter 164 (typed for data type 163T through refer to metadata store 151) after item presenter 114 without interfering with the functionality of view 112. Items presenter 113 can then present data values 106V, 161V, 104V, and 163V at item presenters 116, 162, 114, and 164 respectively to reflect the insertion of data element 163 into data collection 103.

Referring now to FIG. 1D, it may be that a drag and drop gesture is used to drag data value 104V out of items presenter 113 and drop value 104V outside of items presenter 113. Items presenter 113 can detect that data value 104V has been dragged and dropped outside of items presenter 113. Dropping data value 104V outside of items presenter 113 can indicate a desired user change to remove data element 104 from data collection 103.

Items presenter 113 can process the drag and drop gesture within items presenter 113 to remove item presenter 114 from items presenter 113 and remove data element 104 form data collection 103 without interfering with the functionality of view 112. Items presenter 113 can then present data values 106V, 161V, and 163V at item presenters 116, 162, and 164 respectively to reflect deletion of data element 104.

Figure 1E:
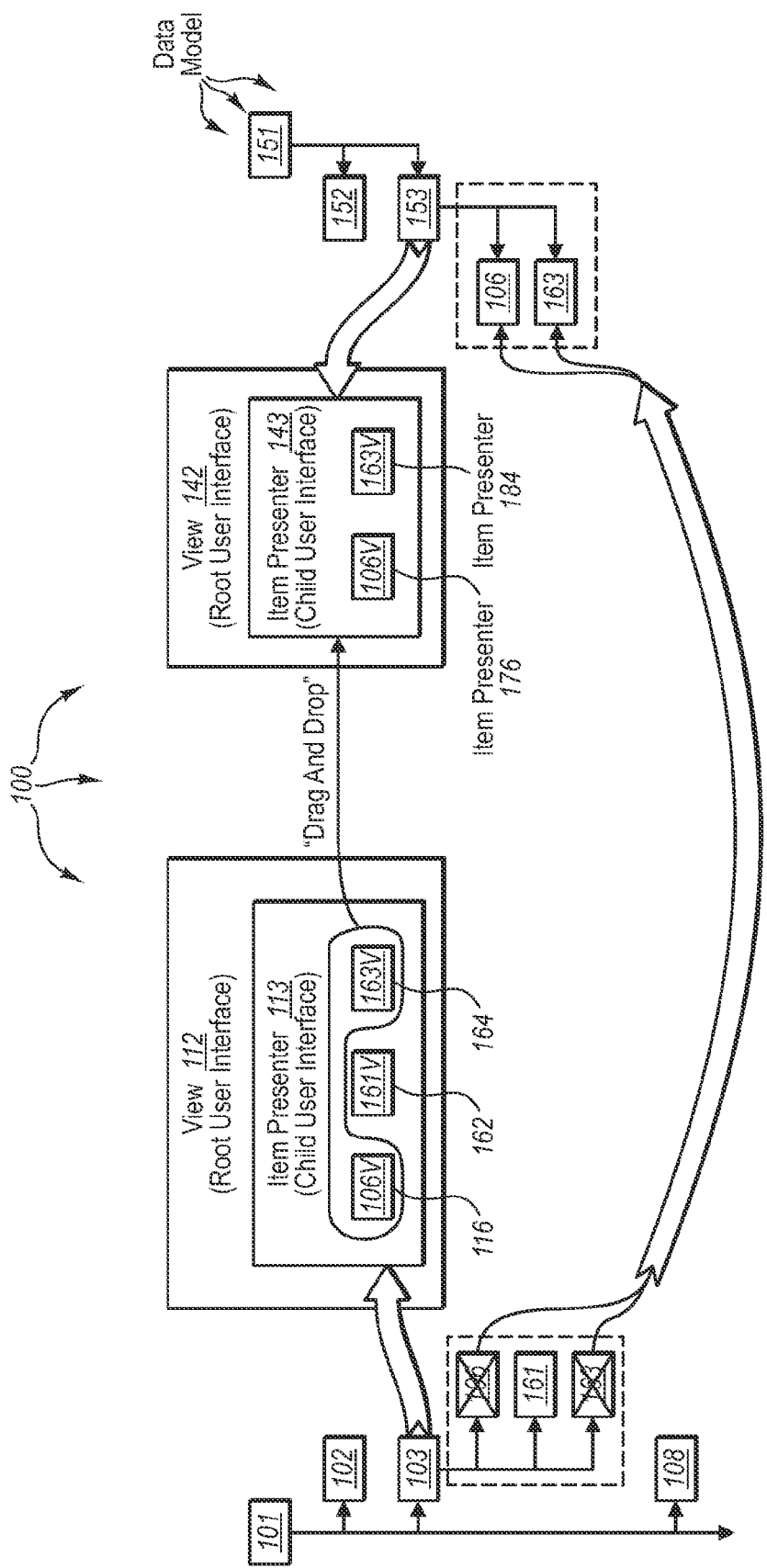
FIG. 1E illustrates components of the computer architecture of FIG. 1A that facilitate moving a plurality of data elements between data collections.
Figure 3:
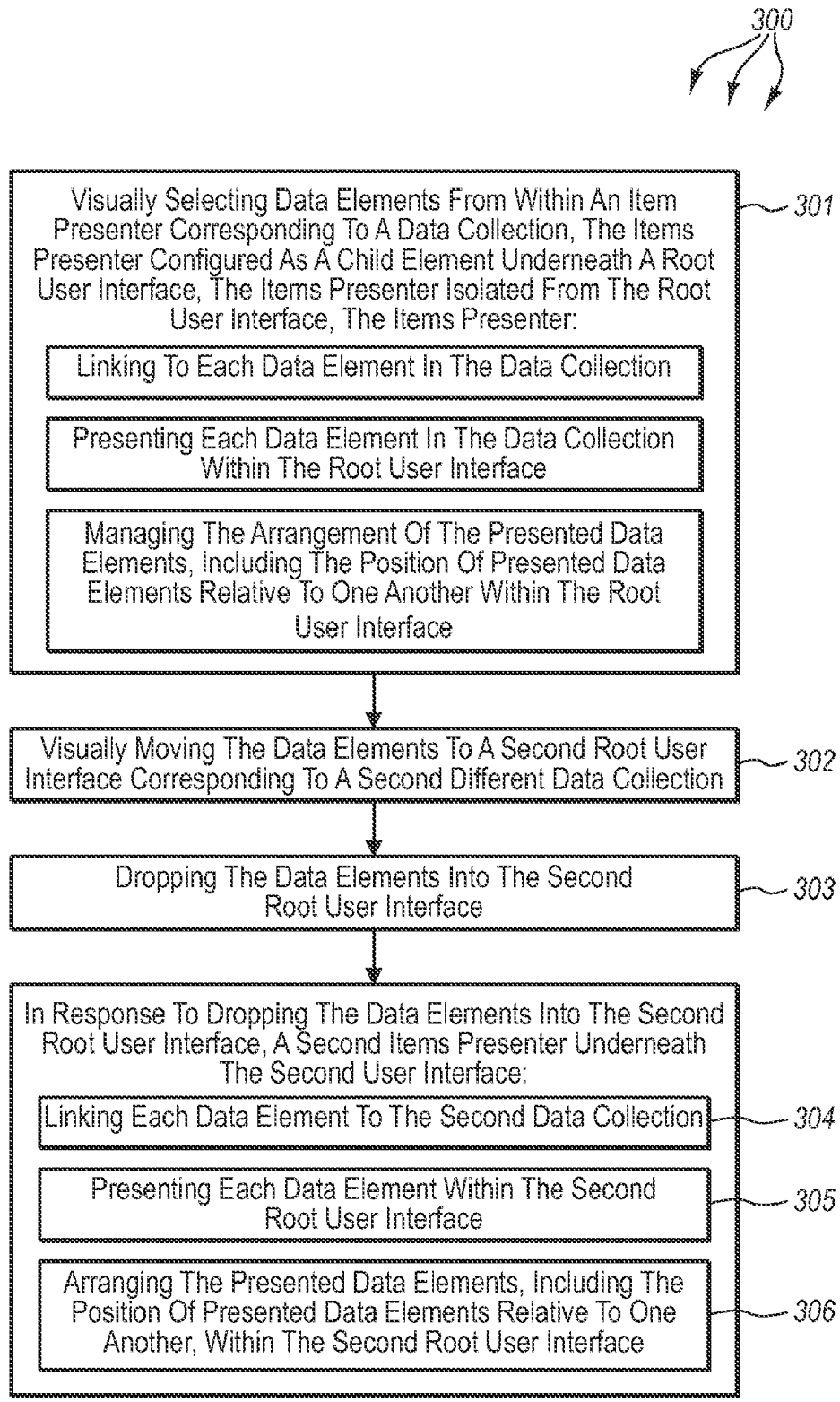
FIG. 3 illustrates a flow chart of an example method for moving a plurality of data elements between data collections.

Embodiments of the invention can also be used to move a plurality of data elements between data collections (e.g., using a single gesture). FIG. 1E illustrates components of computer architecture 100 that facilitate moving a plurality of data elements between data collections. FIG. 3 illustrates a flow chart of an example method for moving a plurality of data elements between data collections. Method 300 will be described with respect to the components can data in FIG. 1E.

Method 300 includes an act of visually selecting data elements from within an items presenter corresponding to a data collection, the items presenter configured as a child element underneath a root user interface, the items presenter isolated from the root user interface (act 301). For example, data elements 106 and 163 can be selected using a drag and drop gesture from within items presenter 113. Items presenter 113 can be configured to link to data elements 106, 161, and 163 to data collection 103. Items presenter 113 can also configured to visually present data elements 106, 161, and 163 within view 112. Items presenter 113 can also configure to manage the arrangement of presented data elements from data collection 103, including the position of data elements 106, 161, and 163 relative to another, within view 112.

Method 300 includes an act of visually moving the data elements of the to a second root user interface corresponding to a second different data collection (act 302). For example, data elements 106 and 163 of can be dragged to view 142. View 142 can be another root user interface at computer system 111 or a root user interface at another computer system Thus, view 142 may or may not be located at a computer system 111. Data collection 153 can be included along with data collection 152 in data model 151. Method 300 includes an act of dropping the data elements into the second root user interface (act 303). For example, data elements 106 and 163can be dropped into items presenter 143 (a second items presenter).

Method 300 includes in response to dropping the data elements into the second root user interface, an act of a second item presenter underneath the second user interface linking each data element to a second data collection (act 304). For example, items presenter 143 can link data elements 106and 163 to data collection 153. Items presenter 133 can be isolated from view 142 similar to item presenter 113's isolation from view 112.

Method 300 also includes in response to dropping the data elements into the second root user interface, an act of the second items presenter presenting each data element within the second root user interface (act 305). For example, items presenter 113 can present item presenters 176 and 184 displaying values 106V and 163V respectively within view 142. Method 300 also includes in response to dropping the data elements into the second root user interface, an act of the second items presenter arranging the presented data elements, including the position of presented data elements relative to one another, within the second root user interface (act 306). For example, items presenter 143 can arrange data elements 106, 163, including their positions relative to one another, in view 142.

Also, in response to moving data elements 106 and 163 from view 112 to view 142, data elements 106 and 163 can be added to data collection 153 and data elements 106 and 163 can be removed from data collection 103.

Figure 4:
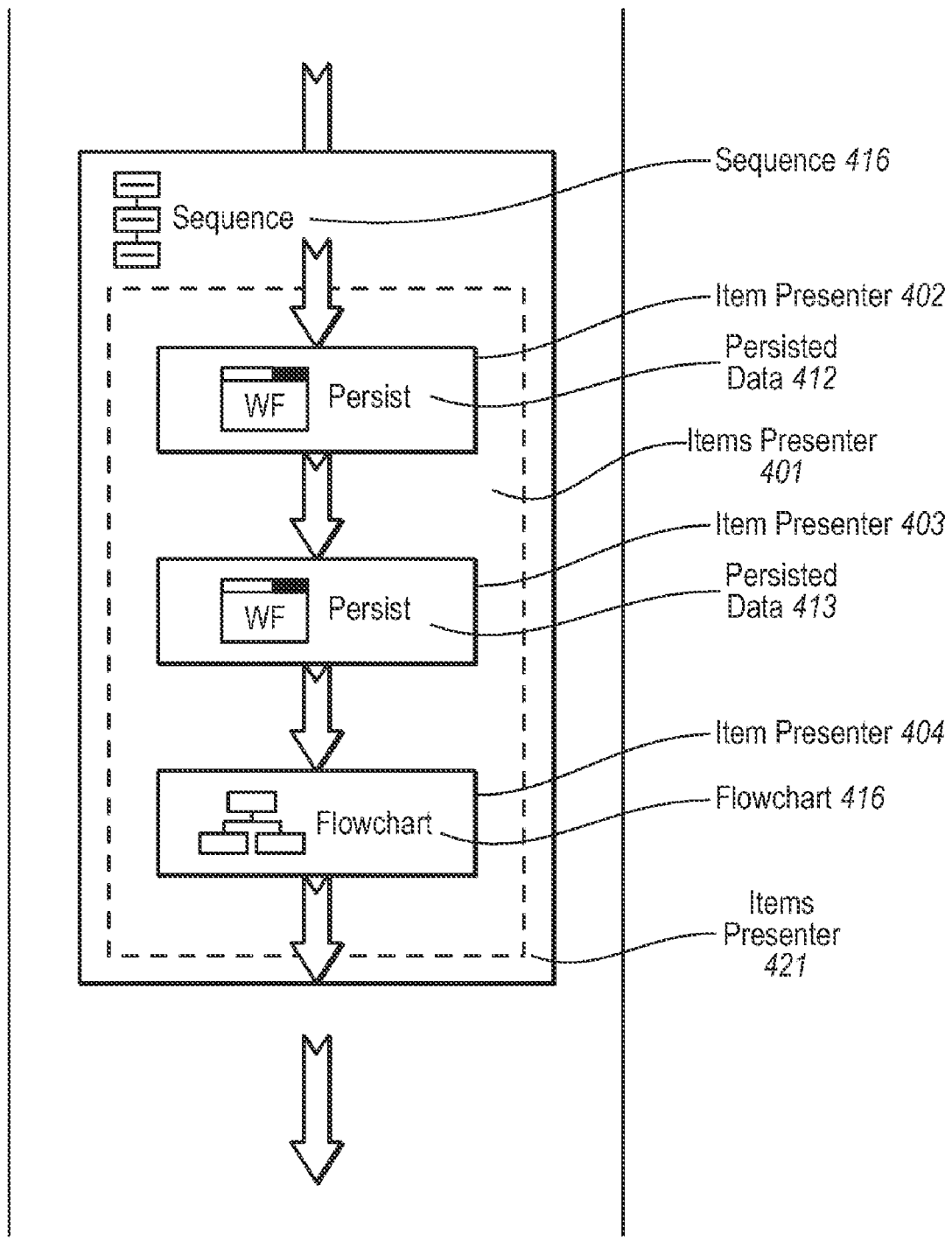
FIG. 4 illustrates an example of a sequence designer built from item presenters.

Embodiments of the invention can also be used to efficiently design and populate sequences. FIG. 4 illustrates an example of a sequence designer built from item presenters. As depicted, items presenter 421 is used to present data elements for sequence 416. Item presenter 401 is further included in items presenter 401. Thus, items presenter 421 can be a higher level child user interface of a root user interface, such as, for example, a view. Item presenter 401 can be a child user interface of item presenter 421. As depicted, sequence 406 includes persisted database data 412, persisted database data 413, and flow chart 416. Item presenters within (and that are child user interface elements of) item presenter 401 are matched to the data types of the data included in sequence 416. For example, item presenters 402 and 403 matched to persisted database data 412 and 413 respectively and item presenter 404 is matched to flow chart 416. Accordingly, different editing experiences can be rendered for different types of contents contained in a collection.

Accordingly, embodiments of the invention include items presenters that present data collections along with custom designers for each data element in the data collection. The custom designers also permit data elements in the collection to be edited in situ. Items presenters maintain data elements in a position aware fashion. Thus, data elements can be inserted into (potentially at a specified location) and deleted from an item presenter to corresponding add and delete the data elements from a data collection. Data elements can be visually moved from an items presenter in one root user interface to an items presenter in another root user interface to corresponding move the data elements between corresponding data collections Further, the drag and drop solutions facilitated by the invention provide a richer customization experience. Visual placeholders for data in a data collection are provided as part of the design experience. A runtime configurable metadata store is provided to maintain the mappings between types and designers. Thus, configurations can be altered at the runtime of the control, rather than a fixed set of potential templates being provided at design time. Items presenters render contained instances of types using designers specified in the metadata store. Items presenters can be used when a data collection is exposed as a property on the containing type. As such, data collections can be visually moved to and from root user interfaces, potentially within multiple owning objects.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer-implemented method for visually editing a portion of a data collection, the method comprising:
   an act of presenting a root user interface to visualize data from a data collection including a plurality of data elements;
   an act of presenting an items presenter within the root user interface, the items presenter configured as a child element underneath the root user interface, the items presenter isolated from the root user interface, the item presenter configured to:
      link to each element in the plurality of data elements;
      visually present each element in the plurality of data elements;
      manage the arrangement of the presented data elements, including the position of presented data elements relative to one another within the root user interface;
      process changes to the presented data elements within the items presenter in isolation from the root user interface such that changes to presented data elements can be implemented without interfering with the functionality of the root user interface; and
   an act of detecting user input representing a visual gesture with respect to the plurality of data elements, the visual gesture indicative of a desired user change to the arrangement of the presented data elements;
   an act of accessing a metadata store to determine, based on the user input, an appropriate editor for those data types that correspond to the data elements in the data collection, wherein each editor is typed to match the data types of the data elements;
   an act of the items presenter processing the visual gesture within the items presenter to implement the desired user change to the arrangement of the presented data elements without interfering with the functionality of the root user interface; and
   an act of presenting the data elements after processing the visual gesture to reflect the desired user change to the arrangement of the presented data elements.

2. The method as recited in claim 1, wherein the act of presenting an items presenter within the root user interface comprises an act of presenting an items presenter with a configurable text string indicating what the user is to drop onto the items presenter.

3. The method as recited in claim 1, wherein the act of presenting an items presenter within the root user interface comprises an act of presenting an items presenter within a sequence at design time.

4. The method as recited in claim 1, wherein the act of detecting user input representing a visual gesture with respect to the plurality of data elements comprises an act of detecting a drop and drop gesture to add a data element to the items presenter.

5. The method as recited in claim 4, wherein the act of detecting a drop and drop gesture to add a data element to items presenter comprises an act of detecting a drag and drop gesture to add a data element at a specified location between other data elements of the items presenter.

6. The method as recited in claim 1, wherein the act of detecting user input representing a visual gesture with respect to the plurality of data elements comprises an act of detecting a drop and drop gesture to remove a data element from the items presenter.

7. The method as recited in claim 1, wherein the act of detecting user input representing a visual gesture with respect to the plurality of data elements comprises an act of detecting an editing gesture to edit the value of a presented data element.

8. The method as recited in claim 1, further comprising prior to detecting the visual gesture indicative of a change:
   an act of presenting visual placeholders for data elements in the data collection;
   an act of detecting a drag and drop gesture that drops the data collection onto the items presenter;
   an act of determining data types for the data elements included in the data collection;
   an act of referring to a metadata store to identify appropriate editors for the data elements, the editors typed to match the data types of the data elements;
   an act of instantiating the appropriate editors for the data elements within the place holders; and
   an act of presenting data values for the data elements in the appropriate editors.

9. The method as recited in claim 1, further comprising an act of binding the items presenter to the data collection in accordance with mark-up language instructions configured for use with a graphical presentation foundation.

10. The method as recited in claim 9, wherein the act of binding the items presenter to the data collection in accordance with mark-up language instructions configured for use with a graphical presentation foundation comprises an act binding the items presenter to the data collection in accordance with Extensible Application Markup Language instructions configured for use with Windows Presentation Foundation.

11. A computer program product for user at a computer system the computer program product for implementing a method for visualizing a data collection, the computer program product comprising one or more computer storage media having stored thereon computer-executable instructions that, when executed at a processor, cause the computer system to perform the method including the following:
  an act of presenting a root user interface to visualize data from a data collection including a plurality of data elements;
  an act of presenting an items presenter within the root user interface, the items presenter configured as a child element underneath the root user interface, the items presenter isolated from the root user interface, the item presenter configured to:
    link to each element in the plurality of data elements;
    visually present each element in the plurality of data elements;
    manage the arrangement of the presented data elements, including the position of presented data elements relative to one another within the root user interface;
    process changes to the presented data elements within the items presenter in isolation from the root user interface such that changes to presented data elements can be implemented with out interfering with the functionality of the root user interface; and
  an act of presenting visual placeholders for data elements in the data collection;
  an act of detecting a drag and drop gesture that drops the data collection onto the items presenter;
  an act of determining data types for the data elements included in the data collection;
  an act of referring to a metadata store to indentify appropriate editors for the data elements, the editors typed to match the data types of the data elements;
  an act of instantiating the appropriate editors for the data elements within the place holders; and
  an act of presenting data values for the data elements in the appropriate editors
  an act of detecting user input representing a visual gesture with respect to the plurality of data elements, the visual gesture indicative of a desired user change to the arrangement of the presented data elements;
  an act of the items presenter processing the visual gesture within the items presenter to implement the desired user change to the arrangement of the presented data elements without interfering with the functionality of the root user interface; and
  an act of presenting the data elements after processing the visual gesture to reflect the desired user change to the arrangement of the presented data elements.

12. The computer program product as recited in claim 11, wherein computer-executable instructions that, when executed, cause the computer system to add an items presenter as a child element of the root user interface, the item presenter comprise computer-executable instructions that, when executed at a processor, cause the computer system to an items presenter as a child element of a sequence.

13. The computer program product as recited in claim 11, further comprising computer-executable that, when executed, cause the computer system to bind the item presenter to the data collection in accordance with Extensible Application Markup Language instructions configured for use with Windows Presentation Foundation.

\* \* \* \* \*